(12) United States Patent
Kobayashi et al.

(10) Patent No.: US 6,268,837 B1
(45) Date of Patent: Jul. 31, 2001

(54) DISPLAY CONTROL DEVICE AND METHOD

(75) Inventors: Kazutomo Kobayashi; Eiichi Iwasa; Masaru Tomita, all of Tokyo (JP)

(73) Assignee: Clarion Co., LTD, Tokyo (JP)

( * ) Notice: Subject to any disclaimer, the term of this patent is extended or adjusted under 35 U.S.C. 154(b) by 0 days.

(21) Appl. No.: 09/225,217

(22) Filed: Jan. 4, 1999

(30) Foreign Application Priority Data

Jan. 7, 1998 (JP) .................................................. 10-011966

(51) Int. Cl.$^7$ ....................................................... G09G 5/00
(52) U.S. Cl. ................................. 345/1; 348/113; 701/208
(58) Field of Search ................................. 345/1; 701/207, 701/208, 209, 200; 702/209; 342/357.1; 348/118, 113, 116; 455/509

(56) References Cited

U.S. PATENT DOCUMENTS

| | | | |
|---|---|---|---|
| 5,187,810 | * 2/1993 | Yoneyama et al. | 455/509 |
| 5,627,547 | 5/1997 | Ramaswamy et al. | |
| 5,638,280 | * 6/1997 | Nishimura et al. | 702/209 |
| 5,875,412 | * 2/1999 | Sulich et al. | 701/207 |
| 5,887,269 | * 3/1999 | Brunts et al. | 701/208 |
| 5,944,768 | * 8/1999 | Ito et al. | 701/200 |
| 5,983,158 | * 11/1999 | Suzuki et al. | 701/209 |
| 5,999,126 | * 12/1999 | Ito | 342/357.1 |
| 6,023,290 | * 2/2000 | Seita | 348/118 |

FOREIGN PATENT DOCUMENTS

| | | |
|---|---|---|
| WO 90 13190 | 11/1990 | (EP) . |
| 0 602 438 A1 | 6/1994 | (EP) . |
| 0 703 719 A2 | 3/1996 | (EP) . |
| 0 740 132 A2 | 10/1996 | (EP) . |
| WO 96 35198 | 11/1996 | (EP) . |
| 297 10 675 U1 | 8/1997 | (EP) . |
| 0 872 710 A1 | 10/1998 | (EP) . |

* cited by examiner

*Primary Examiner*—Steven Saras
*Assistant Examiner*—Fritz Alphonse
(74) *Attorney, Agent, or Firm*—McGinn & Gibb, PLLC

(57) ABSTRACT

A display control device comprises a navigation unit for generating route guidance data; a small-sized display unit for displaying information concerning audio-system; and a main unit connected via an interface to the navigation unit and the small-sized display unit with a communication cable, said main unit including: recognizing means for recognizing the connection of the small-sized display unit; and control means for sending out a request for route guidance display to the navigation unit when the recognizing means recognizes the connection of the small-sized display unit, and causing the received route guidance data to be displayed through interruption on the small-sized display unit when the route guidance data generated by the navigation unit is received via the communication cable and the interface.

20 Claims, 11 Drawing Sheets

DISPLAY CONTROL DEVICE AND METHOD

BACKGROUND OF THE INVENTION

The present invention relates to a display control device of an audio/visual system equipped with at least a small-sized display for audio-system, and a control method. More particularly, the invention relates to a display control device and method, which enables the display of navigation information (route guidance information) by utilizing the small-sized display provided for audio-system.

In vehicle-mounted audio/visual and navigation systems of, for example, automobiles, it has been common practice to provide a large-sized liquid crystal display 61 of approximately 5 inches as a means of displaying navigational information as shown in FIG. 6. More specifically, audio/visual equipment 62 having a small-sized liquid crystal display 621 for displaying audio or visual operating conditions in the form of characters, and navigation equipment 63 are connected via respective signal lines 64, 65 to the large-sized liquid crystal display 61 and when navigation display is selected by pushing a selection button provided to the large-sized liquid crystal display 61, the present position of one's own car and surrounding map information are displayed on the large-sized liquid crystal display 61 according to positional information obtainable from the GPS receiver of the navigation equipment 63 and the map data read from CD-ROM.

Alternatively, when visual display is selected, the TV broadcasting received by the audio/visual equipment 62 or the video image reproduced by the audio/visual equipment 62 is displayed on the large-sized liquid crystal display 61.

FIG. 7 is a schematic diagram illustrating a conventional audio/visual system configuration in that a large-sized liquid crystal display is not provided or, even if a large-sized LCD is provided but it is retracted in the case body. In such cases, the operating condition of navigation equipment may be displayed on the display of audio/visual equipment.

In FIG. 7, a signal line 66 is used to connect audio/visual equipment 62 and navigation equipment 63 and when the navigation equipment 63 is in operation, a character such as "NAVIGATION" is displayed on the small-sized liquid crystal display 621 of the audio/visual equipment 62.

However, there is a problem with the system of displaying navigational information (route guidance information) on the large-sized liquid crystal display as aforesaid in that the navigational function is not fully demonstrated because a detailed map picture and the like cannot be displayed unless the large-sized liquid crystal display is installed.

In the system of utilizing the small-sized liquid crystal display of the audio/visual equipment, moreover, it can only be displayed whether or not the navigation equipment is in operation and therefore route guidance can be given only in voice.

SUMMARY OF THE INVENTION

An object of the present invention made in view of the foregoing problems is to provide a display control system capable of causing navigational information (route guidance information) to be automatically, and simply displayed through interruption by utilizing an in-system small-sized display even in a case that a large-sized display for displaying the navigational information is absent or even where a self-contained large-sized display is installed.

In order to solve the foregoing problems, a display control system according to the present invention comprises: a navigation unit for generating route guidance data and a main unit connected via an interface to the navigation unit and a small-sized display unit with a communication cable, the main unit including: recognizing means for recognizing the connection of the large-sized display unit; and control means for sending out a request for route guidance display to the navigation unit when the recognizing means recognizes the connection of the small-sized display unit and causing the received route guidance data to be displayed through interruption on the small-sized display unit when the route guidance data generated by the navigation unit is received via the communication cable and the interface.

According to the present invention, the navigational information can be automatically displayed through interruption by utilizing the small-sized display unit even without the large-sized display for displaying the navigational information.

In a display control system according the present invention, the main unit described is audio/visual equipment. Thus, the main unit can be formed by utilizing the audio/visual equipment.

In a display control system according to the present invention, the small-sized display unit in the display control system is incorporated in the main unit. Thus, navigational information can be displayed by utilizing the self-contained small-sized display unit of the main unit.

In a display control system according to the present invention, the display control system comprises one of a large-sized display unit and a combined display unit formed by combining a large-sized display and a small-sized display, said one of the large-sized display unit and the combined display unit being connected via a communication cable to the main unit, wherein the control means makes the recognizing means monitor the on/off state of one of the large-sized display unit and the combined display unit and when one of the large-sized display unit and the large-sized display of the combined display unit is recognized to be in the off state, causes the route guidance data generated by the navigation unit to be displayed through interruption on the small-sized display of the combined display unit.

According to the present invention, navigational information can be automatically displayed through interruption by utilizing the small-sized display unit or the small-sized display which is held ON even when the large-sized display unit or the large-sized display of the combined display unit is held OFF, that is, retracted.

DETAILED DESCRIPTION OF THE PREFERRED EMBODIMENTS

A description will subsequently be given of an audio/visual system showing a display control system embodying the present invention with reference to the drawings.

First Embodiment

Figure 1:
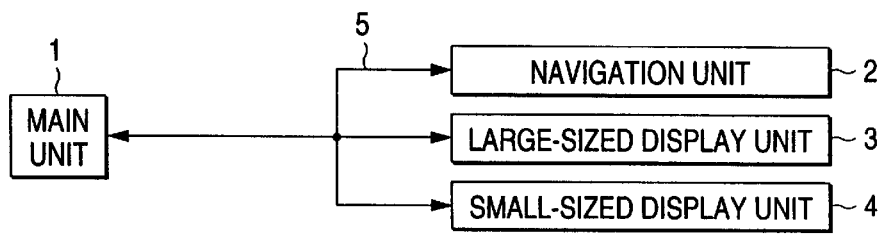
FIG. 1 is a diagram illustrating the schematic configuration of an audio/visual system to which a display control system according to the present invention is applied.

FIG. 1 is a diagram illustrating the schematic configuration of an audio/visual system to which a display control system according to the present invention is applied. Reference numeral 1 in FIG. 1 denotes a main unit having functions of monitoring and controlling the overall state of an audio/visual system. Furthermore, a navigation unit 2 as an object to be controlled, a large-sized display unit 3 and a small-sized display unit 4 which are arranged independently of each other or a display unit 100 in combination of large- and small-sized displays are connected via a communication cable 5 to the main unit 1.

The large-sized display unit 3 comprises a liquid crystal display of 4 inches or greater is used to display not only a map during the operation of the navigation unit 2, the present position of one's own car, but also TV broadcasting or a video image and the like.

The small-sized display unit 4 is a unit which makes a display of the ordinary audio system such as 1 DIN independently of the large-sized display unit 3 and does not interfere with the display made by the large-sized display unit 3 even during the operation of the large-sized display unit 3.

Figure 10A:
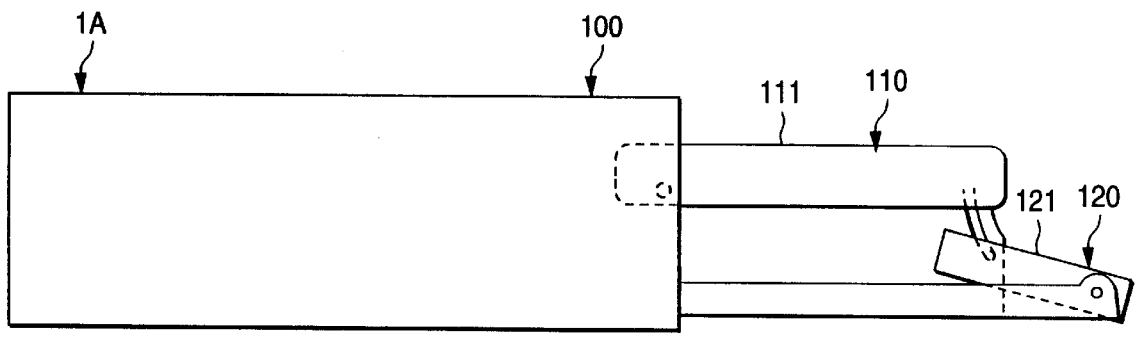
FIGS. 10A to 10C shows operating state of the main unit with built-in display unit.
Figure 10B:
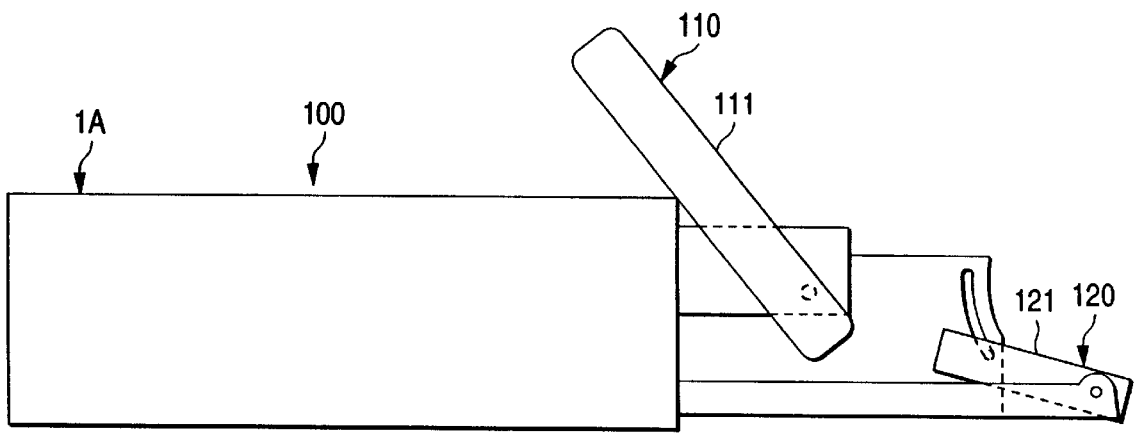
Figure 10C:
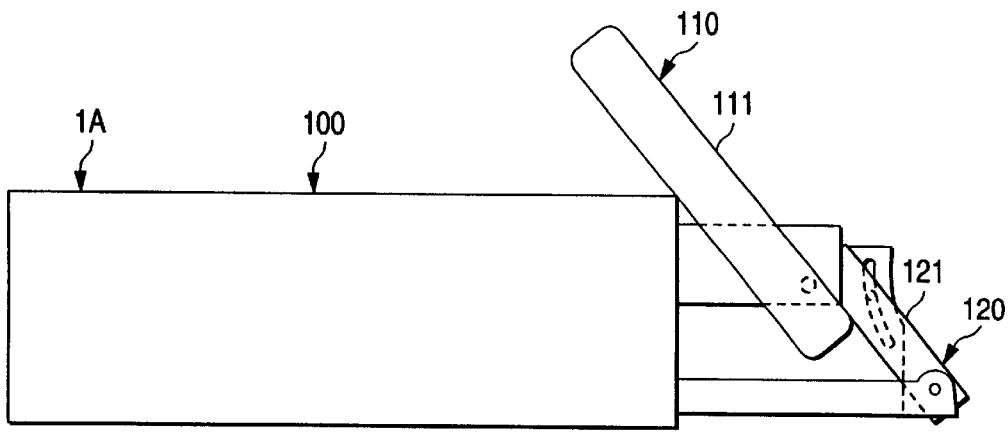

The display unit 100 formed by combining the large- and small-sized displays is constructed as shown in FIGS. 8 to 10C. A large-sized display unit 110 having a large display part 111 and a small-sized display unit 120 having a small display part 121 are accommodated in a unit such as the 1-DIN unit. When an small display part 121 for displaying an audio information is located at a front position to expose outside as shown in FIG. 9A, the large-sized display unit 110 having a large display part 111 such as 5-inch LCD is housed inside of the unit. When a large-sized display unit 110 is slid forward and pivoted upward, the large display part 111 appears on the front side as shown in FIG. 10C.

Figure 2A:
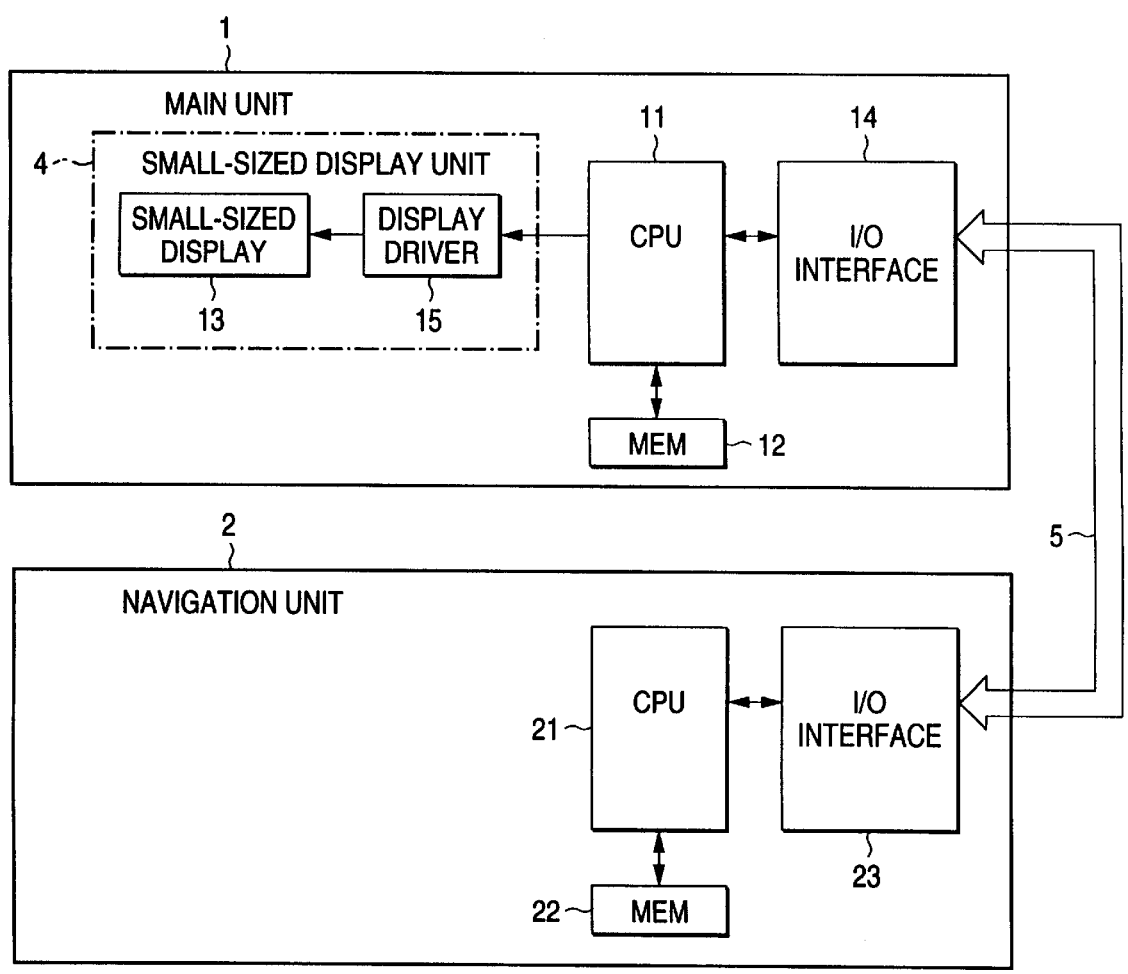
FIGS. 2A to 2C are block diagrams showing outline configuration of audio visual system according to the embodiments of the present invention.

FIG. 2A is a block diagram showing the connection relationship between the main unit 1 and the navigation unit 2.

In FIG. 2A, the main unit 1 comprises an input-output interface 14 which communicates a communication cable to which a large-sized display unit 3 and the navigation unit 2 are connected, a small-sized display unit 4 having a small display 13 for displaying an audio information, a memory (MEM) 12 for storing various control programs, and CPU for controlling a whole of the main unit 1.

The small sized display unit 4 usually includes a small sized display 13 for displaying audio information and a display driver 15 for controlling and driving the small display 13.

The CPU 11 is provided with the processing functions of controlling the whole system, recognizing the state of the large-sized display unit 3 and the small-sized display unit 4 which are independent of each other, or the state of the a display unit 100, and causing route guidance information to be displayed on the small display 13 of the small-sized display unit 4 or the small display portion 120 of the display unit 100 if the large-sized display for displaying the route guidance information is not provided or the large-sized display has been retracted.

The memory 12 is used to store not only the data processed by the CPU 11 but also a program for recognizing and processing the state of the large-sized display unit 3, the small-sized display unit 4 and the display unit 100, a program for displaying and interruption processing the route guidance information on the small display 13 of the small-sized display unit 4 or the small display 121 of the small sized display unit 120, and a program for communicating with an object to be controlled.

The navigation unit 2 includes an I/O interface 23 which is connected and communicated with the communication cable 5, a memory (MEM) 22 for storing various data and programs, and CPU 21 for controlling a whole of the navigation unit 2.

The CPU 21 is provided with the processing functions of controlling the whole navigation unit 2 and causing the navigational information to be displayed on the large display of the large-sized display unit 3 or the large display 111 of the large-sized display unit 110 of the display unit 100, the communication processing function of transmitting route guidance information to the main unit 1 in compliance with a display request from the main unit 1 when the route guidance information cannot be displayed on the large display of the large-sized display unit 3 and the large display part 111 of the large-sized display unit 110.

The memory 22 is used to store the data processed by the CPU 21 and a processing program for displaying the route guidance information on the large display part of the large-sized display unit 4 or a large display part 111 of the large-sized display unit 110, and a processing program for processing the transmission of the route guidance data to the main unit 1.

The CPU 11 and the memory 12 constitute recognizing and control means according to the present invention, respectively.

Figure 3:
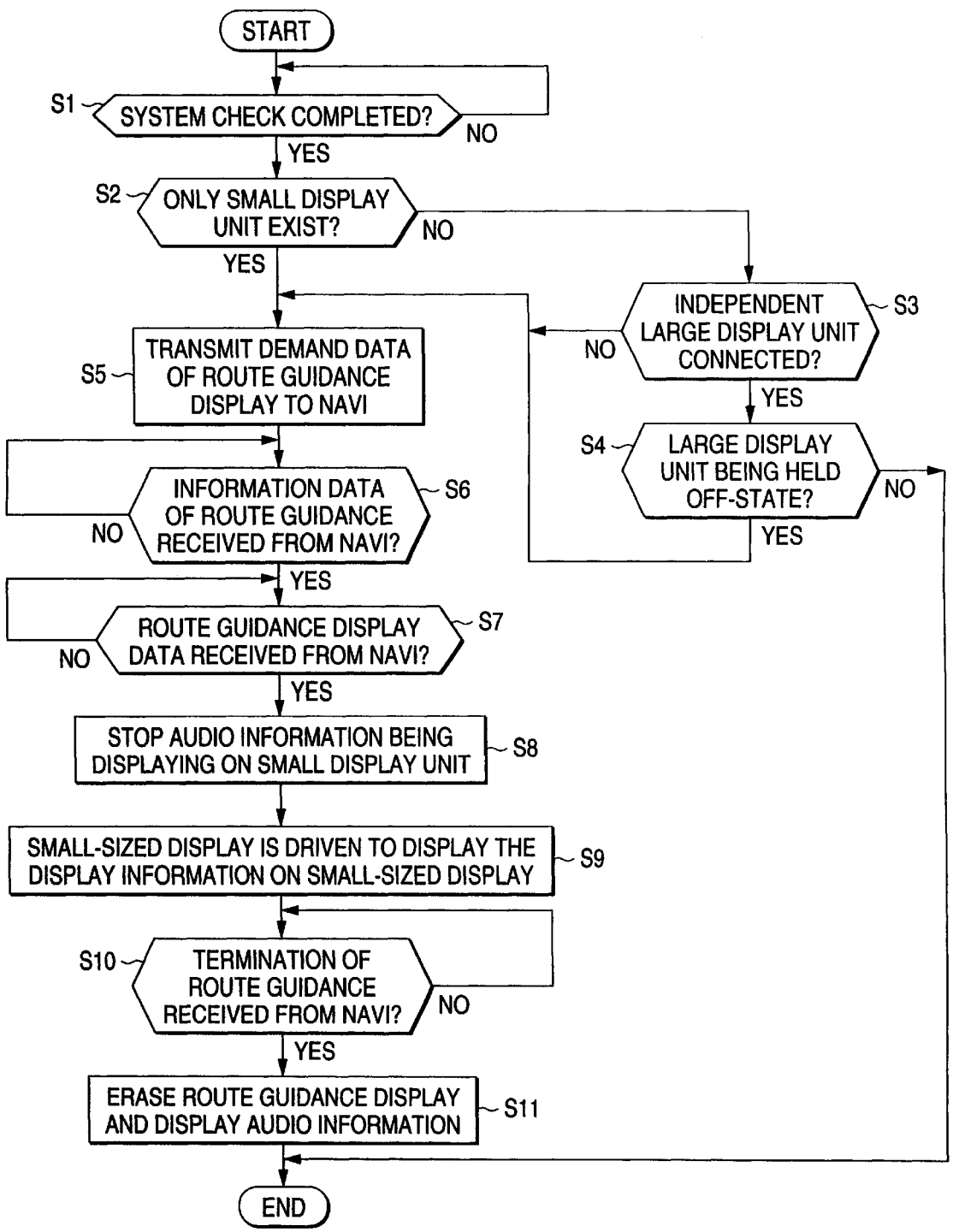
FIG. 3 is a flowchart showing a processing procedure in the main unit of the first embodiment.

A description will subsequently be given of the operation of the first embodiment of the present invention. FIG. 3 is a flowchart showing a processing procedure in the main unit 1.

In FIG. 3, when the main unit 1 starts the operation, the CPU 11 decides whether or not the checking of the whole system of the main unit 1 has been completed (Step S1).

If the system check has been completed, the CPU 11 decides whether or not only an independent small-sized display 4 or a small display unit 120 of the display unit 100 is connected to the main unit 1 (Step S2).

If, to the main unit 1, other than the independent small-sized display 4 or a small display unit 120 of the display unit 100 is connected, it is judged whether an independent large-sized display unit 3 is connected. (Step 3) In the step 3, the reason why only connection of the independent large-sized display unit 3 is judged is that it assumed the cases there is a connection other than the independent small-sized display unit 4 in step 2. If it is determined in step 2 that the small display unit 120 of the display unit is connected, because a large-sized display unit 110 is a part of the display unit 100, it can be judged that the large display is connected to the main unit 1.

In step 3, if the independent large-sized display unit 3 is connected, then it is judged whether the large display part of the large-sized display unit 3 or the large display 111 of the large-sized display unit 110 is in off-state. That is, it is judged whether displaying is available or not. (Step 4).

When the large-sized display unit 3 or the large display 111 of the large-sized display unit 110 is in off-state, demand data that demand route guidance information to the navigation unit is transmitted. (Step 5) Then, it is judged whether information data relating to the route guidance information is received or not. (Step 6)

If the information data relating to the route guidance information is received from the navigation unit 2 is received, then it is judged whether display data concerning route guidance information from the navigation unit is received or not. (Step 7)

Figure 4:
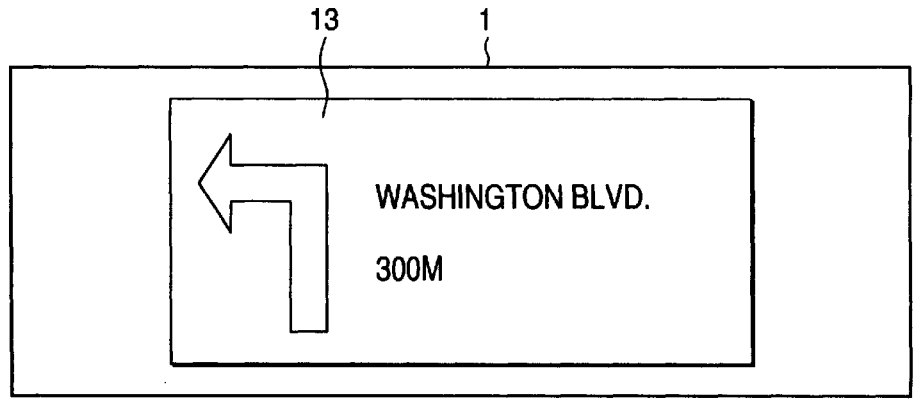
FIG. 4 is a diagram illustrating an example of navigational information to be displayed on the small-sized display unit.

If the display data concerning the route guidance information is received from the navigation unit 2, the small display 13 of the small-sized display unit 4 or the small display 121 of the small-sized display unit 120 in the display unit 100 is stopped displaying of the audio information. (Step 8) In stead of the audio information, route guidance information based on the display data received from the navigation unit 2 are interrupt-displayed on the small display part 13 of the small-sized display unit 4 or the small display 121 of the small-sized display unit 120 as shown in FIG. 4. (Step 9)

As shown in FIG. 4, an intersection name on the guidance route of one's own car, the remaining distance up to the intersection, an arrow for indicating the direction and the like are displayed on the small display part 13 of the small-sized display unit 4 or the small display 121 of the small-sized display unit 120.

After process of step 9, it is judged whether information data relating to finishing of route guidance is received from the navigation unit 2. (Step 10)

If the information data relating to the finish of route guidance is received, audio information is displayed instead of the route guidance information, which is displaying on the small display part 13 or the small display part 121. (Step 11) Then, the process is completed. Accordingly, till the information data relating to finish of the route guidance is received, the route guidance information is displayed on the small display part 13 or the small display part 121 in stead of the audio information which is originally displayed on the small display.

If the independent large-sized display unit is not connected to the main unit 1 in step 3, then the process follows to step 5, so that the route guidance information is displayed on the small display unit 4 and small display unit 120.

If the large-sized display unit 3 or the large-sized display unit 110 is not in off-state in step 4, then the route guidance information is displayed on the large-sized display unit as a usual condition, and this process is completed.

Figure 5:
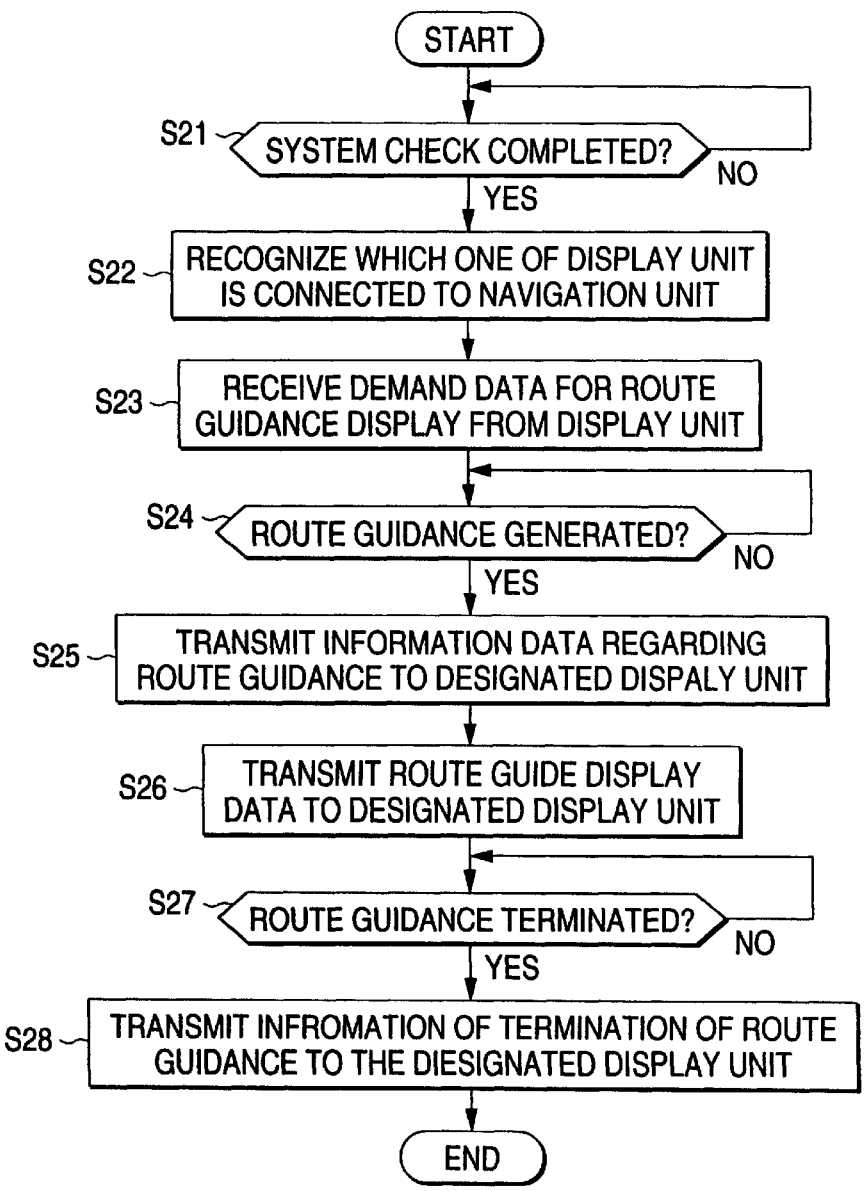
FIG. 5, a flowchart showing a processing procedure in the navigation unit of the present invention.
Figure 6:
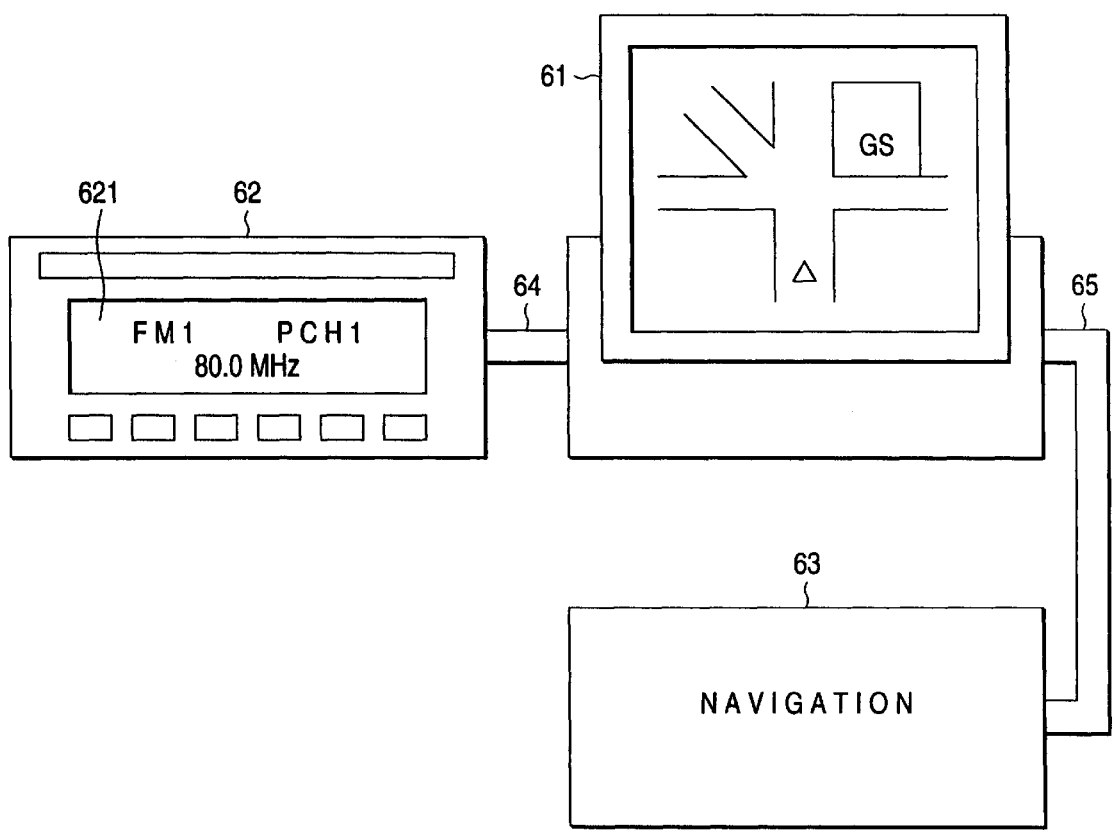
FIG. 6 is a schematic diagram illustrating a conventional audio/visual system configuration.
Figure 7:
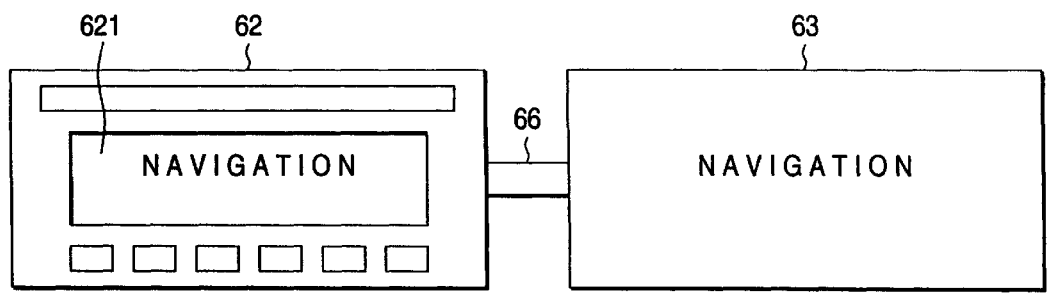
FIG. 7 is a schematic diagram illustrating another conventional audio/visual system configuration.

The processing operation of the navigation unit 2 will subsequently be described with reference to FIG. 5.

In the navigation unit 2, the CPU 21 decides whether or not the checking of the whole system of the navigation unit 2 has been completed (Step S21). If the system check has been completed, the CPU 21 recognizes which one of the display units has been connected to the navigation unit 2 (Step S22).

Then the navigation unit 2 receives demand data for route guidance display from the display unit recognized as what has been connected to the navigation unit 2 (Step S23). Here, the display unit includes an independent large-sized display unit 3 and small-sized display unit 4, and a display unit 100 in which a large-sized display unit 110 and a small-sized display unit 120 are combined therein, which are connected to the navigation unit 2 through the communication cable 5.

If the demand data for route guidance display is received, it is judged whether information data relating to route guidance is generated in the navigation unit 2. Then this process is repeated until the route guidance is generated therein (Step S24).

If the route guidance has thus been generated, information data regarding the route guidance being given is sent out to the display unit as a requester (Step S25). Then, display data of the route guidance is transmitted to the display unit of the requester. (Step 26)

Then the navigation unit 2 decides whether information data relating to termination of the route guidance is generated or not, and repeats this process until the information data relating to the termination of the route guidance. (Step S27)

When the information data relating to the termination of the route guidance is generated, information data relating the termination of route guidance is sent out to the display unit as the requester (step 28) and the display unit is caused to display the information data to the effect.

According to the first embodiment, even if a large-sized display unit 110 having a large display part 111 or an independent large display unit 3 for displaying route guidance information is in a state of unable to display, the route guidance information generated from the navigation unit 2 is automatically and simply displayed on a small display part 121 of the small-sized display unit 120 or a small display part 13 on a small-sized display unit 4 which are connected to the main unit 1, in stead of the audio information which being displayed. Thus, the navigation unit is effectively utilizable to ensure that route guidance is visually given.

In the above, an audio-visual system including an independent large-sized display unit 3 and small-sized display unit 4 and an audio-visual system including a display unit in which a large-sized display unit 110 and a small-sized display unit 120 are assembled are explained as a system configuration of the present invention. Hereinafter, a case of where a system is formed by the independent large-sized display unit and the independent small-sized display unit, and a case of where a system is formed by a display unit in which a large-sized display unit 110 and a small-sized display unit 120 are assembled are respectively explained in detail below.

Second Embodiment

Detail explained is an audio-visual system comprising a main unit 1 with a built-in display unit including a display unit 100 in which a large-sized display unit 110 and a small-sized display unit 120 are assembled and a navigation unit 2.

Figure 8:
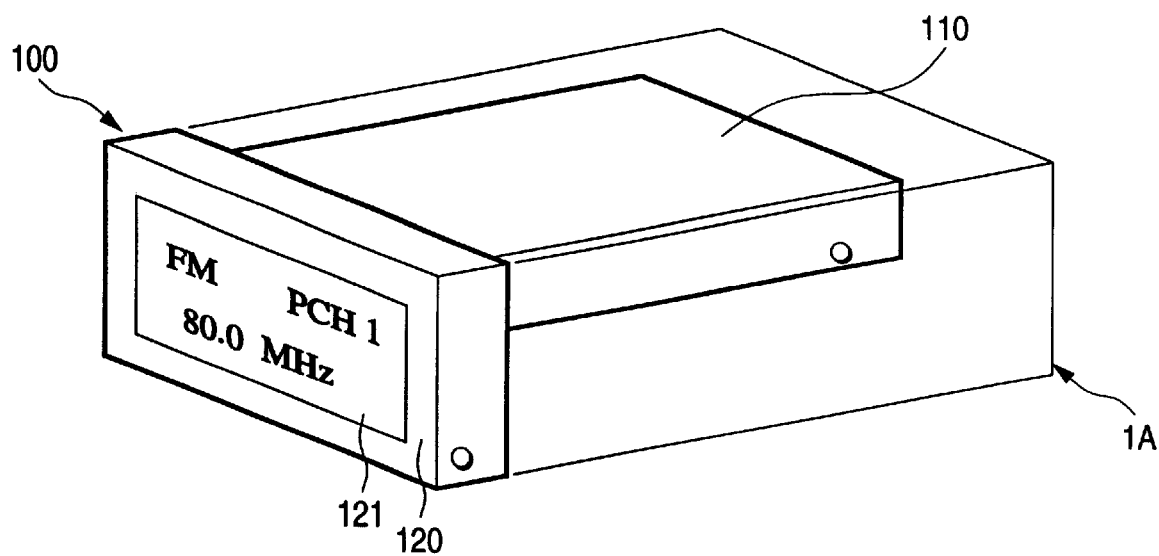
FIG. 8 is a perspective view of a main unit with built-in display unit according to the second embodiment.
Figure 9A:
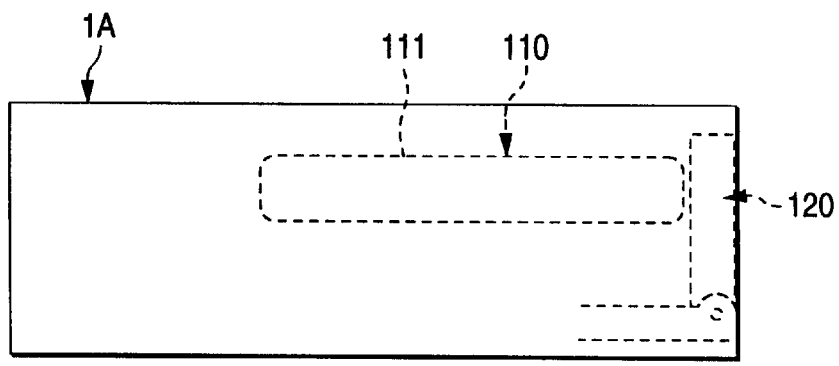
FIGS. 9A to 9C show operating state of the main unit with built-in display unit.
Figure 9B:
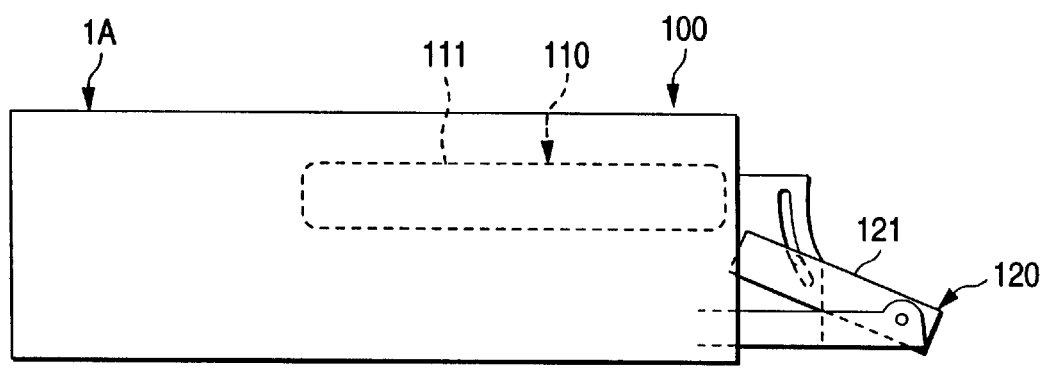
Figure 9C:
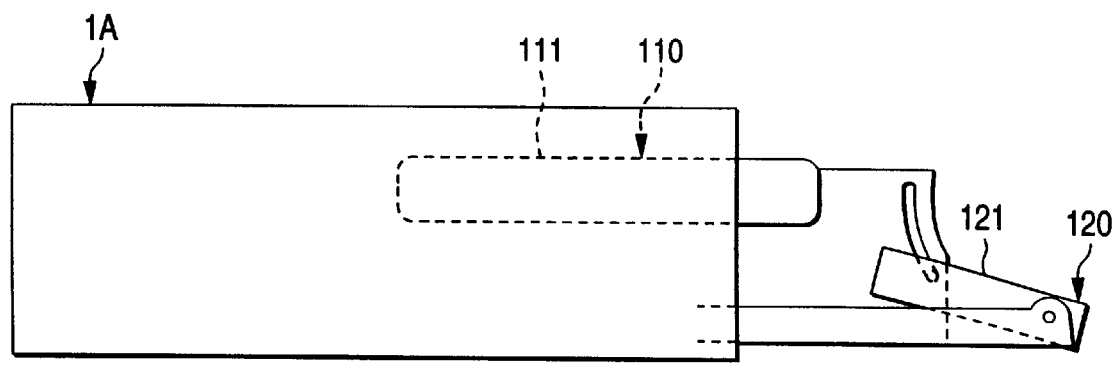

An example of the main unit 1A with the built-in display unit is shown in FIGS. 8 to 10C as a display unit 100 in which a large-sized display unit 110 and a small-sized display unit 120 are assembled therein. FIG. 8 shows a perspective view showing a diagram of the main unit 1A with the built-in display unit. FIGS. 9A to 10C are explanation diagrams of the operations of the main unit with built-in display unit.

The main unit 1A with the built-in display unit, as shown in FIG. 8, incorporates therein a display unit 100 in which a large-sized display unit 110 having a large display part 111 and a small-sized display unit 120 having a small display part 121 are assembled into a body of the main unit.

The large-sized display unit 110 is held by the body of the main unit to be capable of accommodate therein. When the large-sized display unit 110 is forwardly slide and then upwardly rotated, the large display part 111 for displaying visual information such as route guidance information appears at front face of the apparatus.

The small-sized display unit 120 is rotatably held at the front of the apparatus. In response to movement of the large-sized display unit 110, the small-sized display unit 120 rotates to incline downwardly. Even when the small-sized display unit 120 is inclined, the content of display is visible by the small display part 121 for displaying the audio information or the like.

Even if thus structured main unit 1A with built-in display unit is under the operating condition as shown in FIGS. 9A to 10C, the small display part 121 of the small-sized display unit 120 is in a state enabled to display.

Contrary, under the conditions that the large-sized display unit 110 is in a state of retraction shown in FIGS. 9A to 9C and FIGS. 10A and 10B, the large display part 111 of the large-sized display unit 110 is in a state of unable to display. If it is brought into a condition as shown in FIG. 10C, the large display part 111 of the large-sized display unit 110 is brought into a state of enable to display.

Thus, in case of the large display part 111 of the large-sized display unit 110 is enable to display, when the route guidance data is received from the navigation unit 2, the route guidance information is displayed on the large display part 111 according to thus received route guidance data.

Figure 2B:
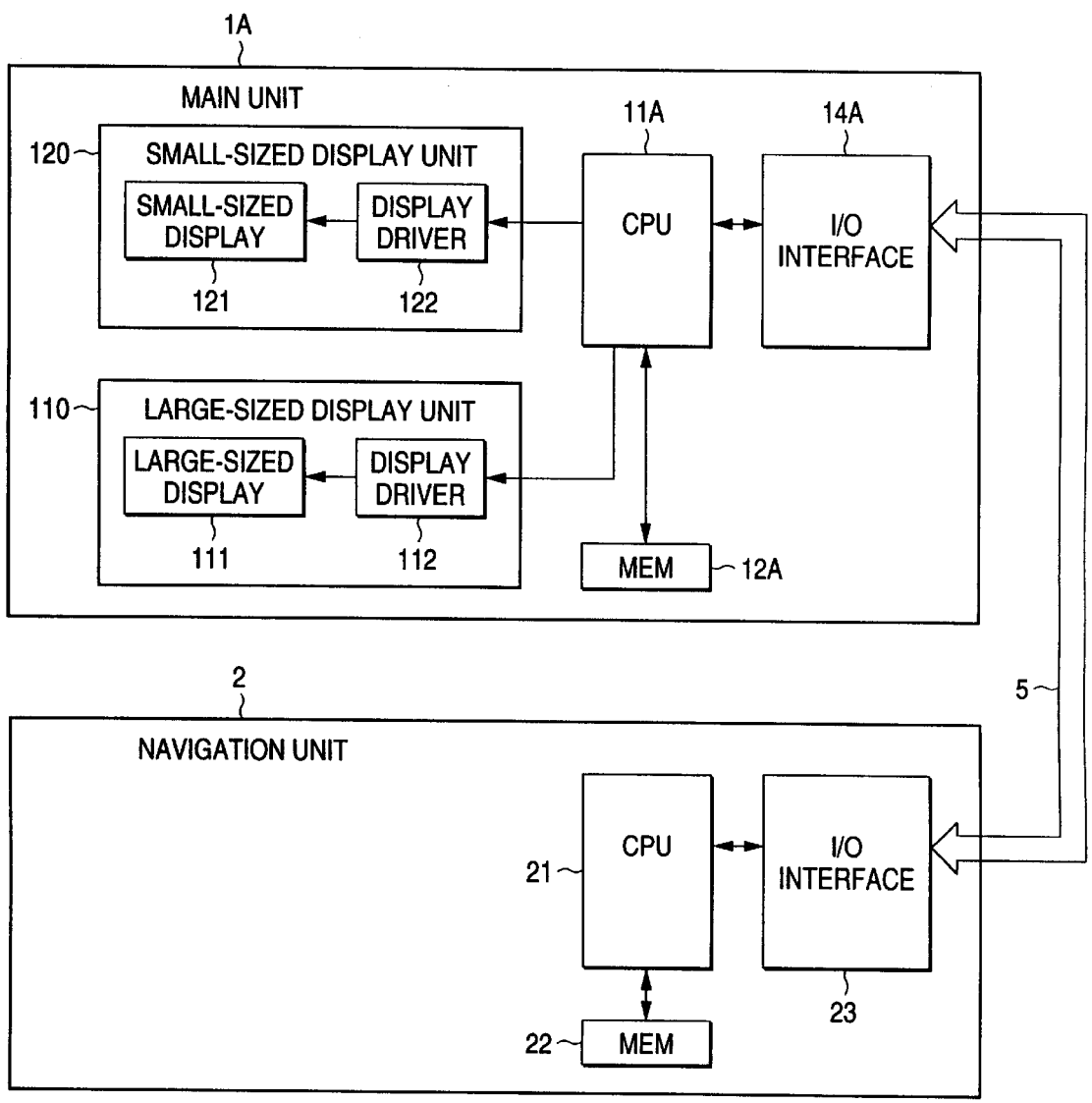

FIG. 2B is a block diagram showing connection relationship between the main unit 1A with the built-in display unit and the navigation unit 2.

The main unit 1A with the built-in display unit as shown in FIG. 2B comprises an input-output interface 14A which communicates a communication cable 5 to which the navigation unit 2 is connected, a display unit 100 including a small-sized display unit 120 having a small display 121 for displaying an audio information and a large-sized display unit 110 having a large display 111 for displaying a visual information, a memory (MEM) 12A for storing various control programs, and CPU for controlling a whole of the main unit 1A.

The CPU 11A is connected to the communication cable 5 through the I/O interface 14A. Thus, the CPU transmits to and receives from the route guidance data or the like through the communication cable 5 so that the CPU controls the whole of main unit 1A. Further, the CPU provides the processing functions of recognizing the state of display unit 100 and causing route guidance information to be displayed on the small display portion 121 of the small-sized display unit 120 if the large-sized display unit 110 having the large display part 111 has been retracted.

The memory 12A is used to store not only the data processed by the CPU 11A but also a program for recognizing and processing the state of the display unit 110, a program for displaying and interruption processing the route guidance information on the small display 121 of the small sized display unit 120, and a program for communicating with an object to be controlled.

As mentioned above, the display unit 100 comprises the small-sized display unit 120 and the large-sized display unit 110. The small-sized display unit 120 includes a small display part 121 that normally displays an audio information and a display driver 122 which controls displaying of the small display part 121. The large-sized display unit 110 includes a large display part 111 that displays route guidance information thereon and a display driver 112 that controls displaying of the large display part 111.

The navigation unit 2 has the substantially same configuration and operations of that of shown in FIG. 2A. Accordingly, the same references are given and the detailed explanation for the structure and operations are omitted here.

Figure 11:
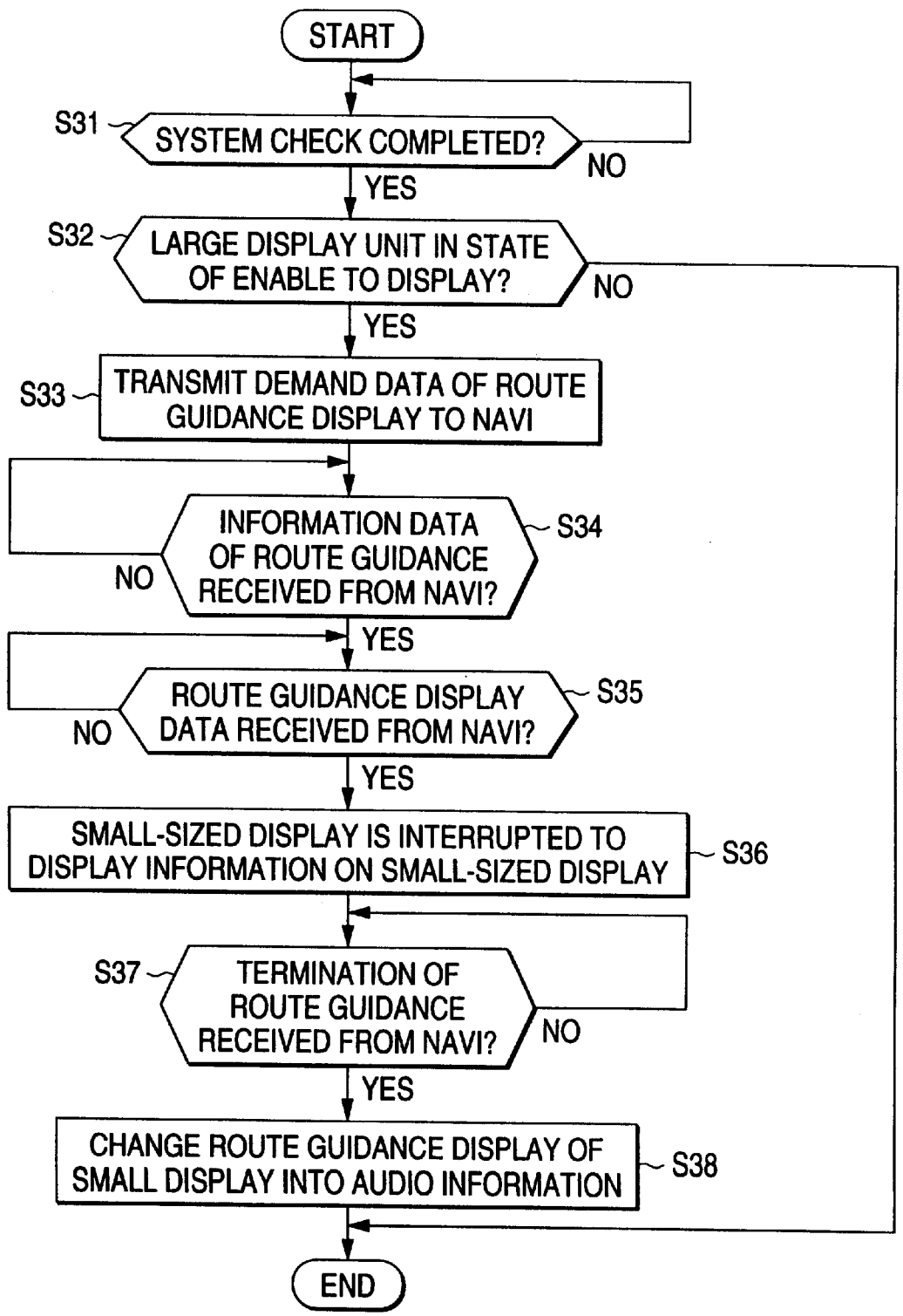
FIG. 11 is a flowchart showing a processing procedure in the main unit of the second embodiment.

Operations of the main unit 1A with the built-in display unit of the second embodiment are explained as follow. FIG. 11 is a flow chart showing a processing procedure in the main unit 1A.

As shown in FIG. 11, when main unit 1 with built-in display unit starts the operation, the CPU 11 decides whether or not the checking of the whole system of the main unit 1 has been completed (Step S31).

If the system check has been completed, the CPU 11 decides whether or not the large display part 111 of the large display unit 110 in the display unit 100 in the main unit 1A is in a state enable to display (Step S32). Where, a state that the large display part 111 is unable to display is defined as the states shown in FIGS. 9A to 9C and 10A and 10B.

If the large display part 111 is not able to display, demand data that demand route guidance information to the navigation unit 2 is transmitted. (Step 33) Then, it is judged whether information data relating to the route guidance information from the navigation unit 2 is received or not. (Step 34)

If the information data relating to the route guidance information is received from the navigation unit 2 is received, then it is judged whether display data concerning route guidance information from the navigation unit 2 is received or not. (Step 35)

If the display data concerning the route guidance information is received from the navigation unit 2, the small display 121 of the small-sized display unit 120 in the display unit 100 is stopped displaying of the audio information. In stead of the audio information, route guidance information based on the display data received from the navigation unit 2 are interrupt-displayed on the small display 121 through the display driver 122 of the small-sized display unit 120 (Step 36)

Further, it is judged whether information data relating to finishing of route guidance is received from the navigation unit 2. (Step 37)

If the information data relating to the finishing of route guidance is received, audio information is displayed instead of the route guidance information which is displaying on the small display part 121. (Step 38) Then, the process is completed.

According to an audio-visual system having the main unit 1A with built-in display unit of the second embodiment, even if a large-sized display unit 110 is in a state of unable to display, for example, the large-sized display unit being retracted, the route guidance information is automatically and simply interrupted to displayed on a small display part 121 of the small-sized display unit 120, instead of the audio information being displayed.

Third Embodiment

Figure 2C:
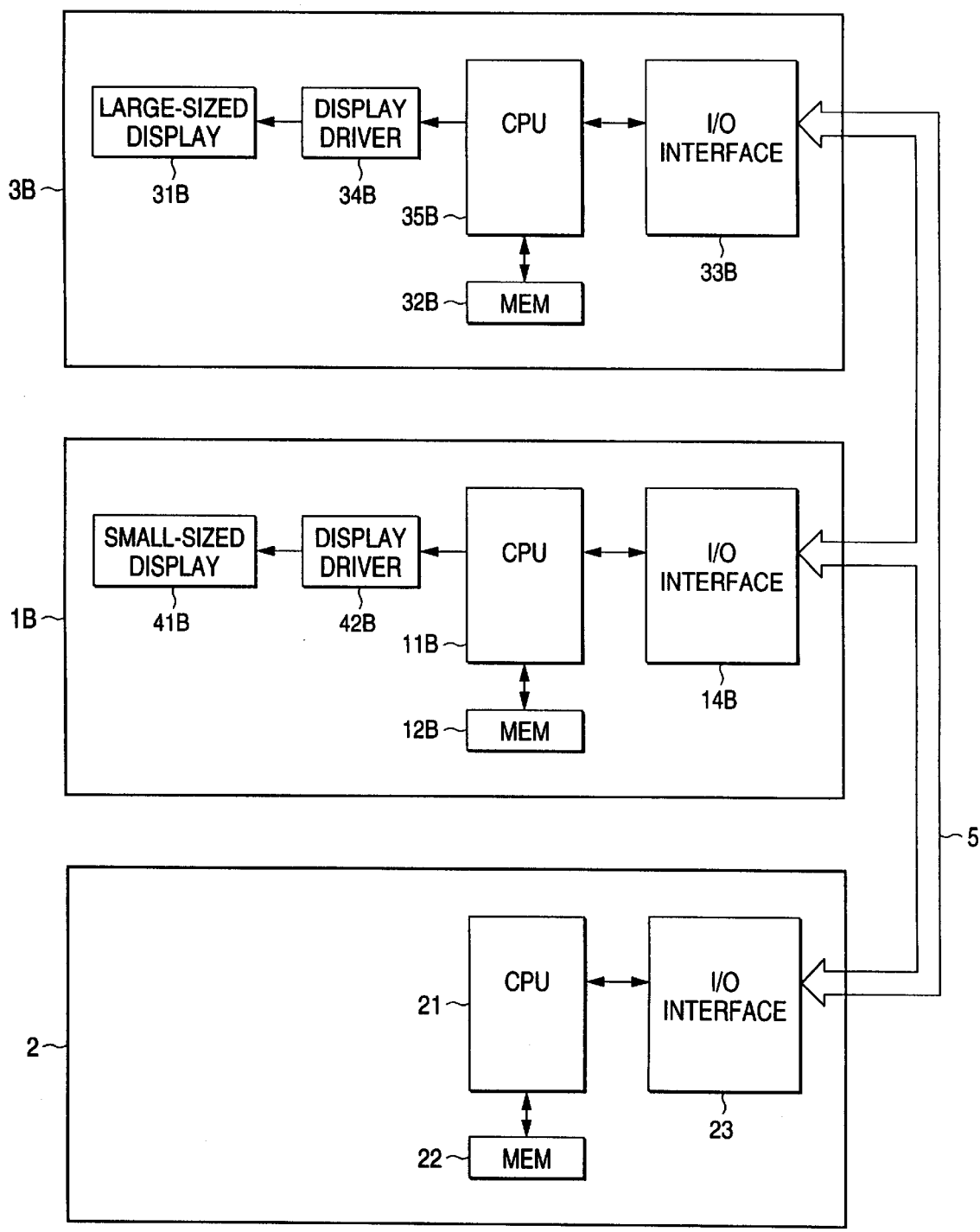

Detail explained is an audio-visual system comprising an independent large-sized display unit 3B, a main unit 1B with a built-in display unit 4B, and a navigation unit 2. FIG. 2C is a block diagram showing audiovisual system of the third embodiment of the invention.

The audio visual system, as shown in FIG. 8, comprises a navigation unit 2 for generating a route guidance data, a large-sized display unit 3B having a large display part 31, and a main unit 1B which controls a whole of the audio visual system and includes a small-sized display unit 4B for displaying ordinary audio information, and a communication cable 5 for connecting the navigation unit 2, the large-sized display unit 3B and the main unit 1B.

The navigation unit 2 has the substantially same configuration and operations of that of shown in FIG. 2A. Accordingly, the same references are given and the detailed explanation for the structure and operations are omitted here.

The large-sized display unit 3B comprises a memory 32B for storing route guidance data or the like obtained by the navigation unit 2, an I/O interface 33B for communicating with the communication cable 5, a large display part 31B for displaying route guidance information based on the route guidance data being stored in the memory 32B, a display driver 34B for controlling the large display part 31B, and a CPU 35B for controlling a whole of the large-sized display unit 3B.

The main unit 1B comprises a small-sized display unit 4B having a small display part 41B for displaying an ordinary audio information and a display driver 42B for controlling the small display part 41B, an I/O interface 14B connected with a communication cable 5, a memory (MEM) 12B for storing various control programs, and CPU 11B for controlling a whole of the main unit 3B.

Figure 12:
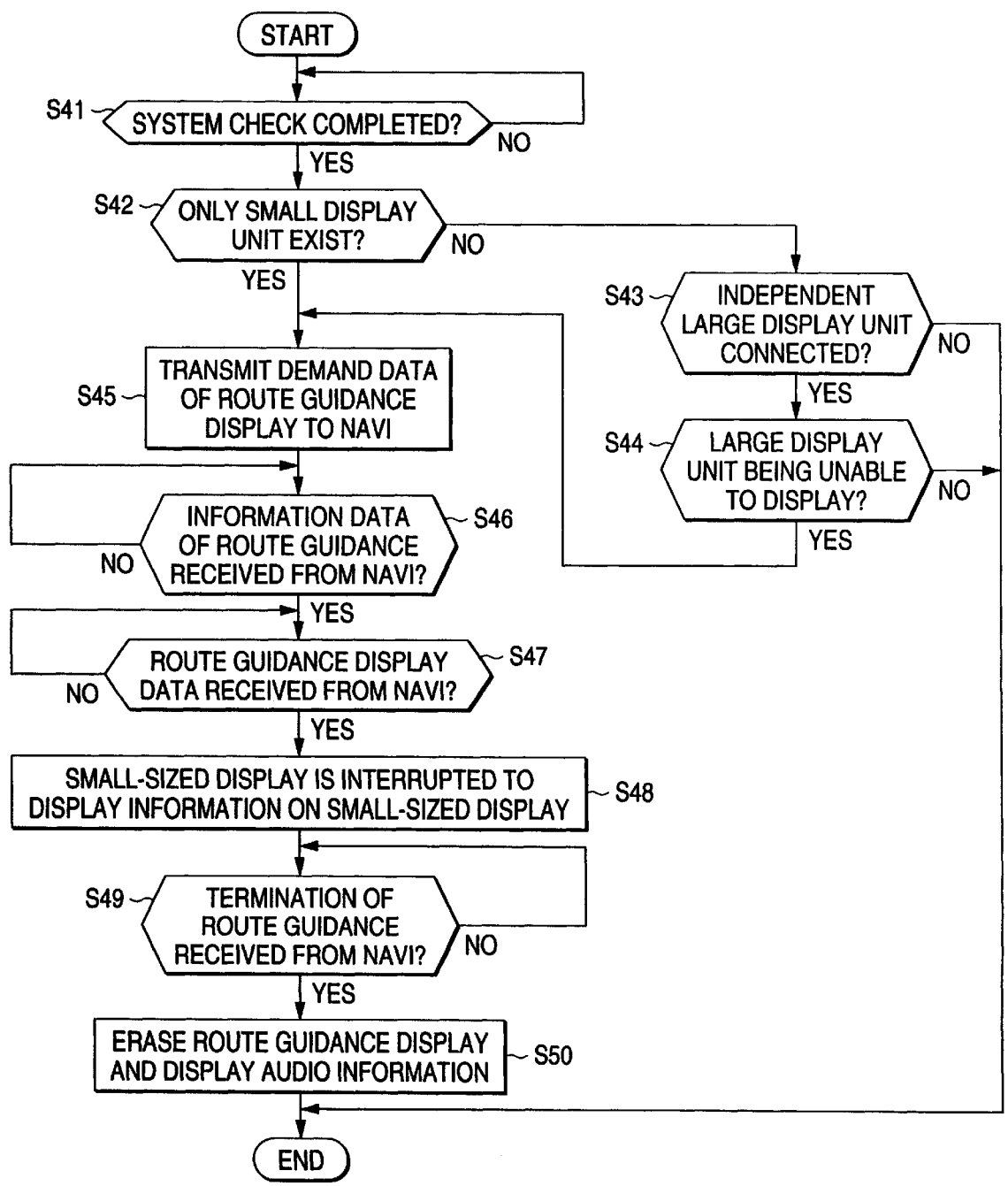
FIG. 12 is a flowchart showing a processing procedure in the main unit of the third embodiment.

Operations of the main unit 1B with the build-in display unit of the third embodiment are explained as follow. FIG. 12 is a flow chart showing a processing procedure in the main unit 1B with a built-in small-sized display unit.

In FIG. 12, when the main unit 1B with a built-in small-sized display unit starts the operation, the CPU 11B decides whether or not the checking of the whole system of the main unit 1B with the build-in small-sized display unit has been completed (Step S41).

If the system check has been completed, the CPU 11B decides whether or not only a small-sized display unit 4B built-in the main unit 1B is connected (Step S42).

If other than the small display unit 4B is connected, it is judged whether a large-sized display unit 3B is connected. (Step 43) If the large-sized display unit 3B is connected, then it is judged whether the large-sized display unit 3B is unable to display (step 44).

When the large-sized display unit 3B is in unable-state, demand data that demand route guidance information is transmitted to the navigation unit. (Step 45) Then, it is judged whether information data relating to the route guidance is received or not. (Step 46)

If the information data relating to the route guidance information is received from the navigation unit 2 is received, then it is judged whether display data concerning route guidance from the navigation unit is received or not. (Step 47)

If the display data concerning the route guidance information is received from the navigation unit 2, the small display 41B is stopped displaying of the audio information. In stead of the audio information, route guidance information based on the display data received from the navigation unit 2 are interrupt-displayed on the small display 41B through the display driver 42B of the small-sized display unit 4B (Step 48).

Further, it is judged whether information data relating to finishing of route guidance is received from the navigation unit 2. (Step 49) If the information data relating to the finishing of route guidance is received, audio information is displayed instead of the route guidance information that is displaying on the small display part 121. (Step 50) Then, the process is completed. That is, the route guidance information is displayed on the small-sized display part 41B until the receiving of information data relating to the finishing of the route guidance.

According to an audio visual system having a main unit 1B with built-in small-sized display unit of the third embodiment of the present invention, even if a large-sized display unit 3B connected to the main unit 1B is in a state of unable to display, for example, the large-sized display unit being 3B is in off-state, the route guidance information is automatically interrupted to displayed on a small display part 41B of the small-sized display unit 4B, in stead of the audio information which being displayed.

Although a description has been given of a case where the large-sized liquid crystal display unit is provided according to the aforesaid embodiments of the invention, the present invention is not limited to the embodiments thereof but may be applicable to displaying the route guidance information generated by the navigation unit by utilizing the built-in small-sized display of the audio unit as a main unit even in vehicles loaded with the navigation unit without having the large-sized liquid crystal display unit 4.

As set forth above, according to the display control system of the present invention, even if the large-sized display part for displaying the route guidance information is not provided, the route guidance information based on the route guidance data from the navigation unit is interrupted to display on the small display part on the small-sized display unit. Thus, the user can visually recognize the route guidance information.

Additionally, according to the present invention, even if the large-sized display unit is in unable state, for example, the large-sized display unit being in an off-state or being retracted, the route guidance information is automatically interrupted to display on the small display part of the small-sized display unit which is able to display, for example, being in power on-state.

Further, according to the present invention, the audio/visual equipment may be used simultaneously as the main unit by utilizing the audio/visual equipment for the main unit.

Furthermore, according to the present invention, the route guidance information can be displayed through interruption on the small-sized display unit built-in the main unit.

What is claimed is:

1. A display control device comprising:

a small-sized display unit, operatively coupled to a navigation unit, for generating route guidance data, for displaying information concerning an audio-system; and a main unit connected via an interface to the navigation unit and the small-sized display unit with a communication cable, said main unit including:

recognizing means for recognizing a state of the small-sized display unit; and control means which judges whether route guidance data is received from said navigation unit if the recognizing means recognizes said small-sized display unit is able to display, and interrupts a display of audio information by the small-sized display unit and displays route guidance information based on the received route guidance data on the small-sized display unit when the route guidance data is received.

2. The display control device as claimed in claim 1, wherein the main unit comprises audio/visual equipment.

3. The display control device as claimed in claim 1, wherein the small-sized display unit is incorporated in the main unit.

4. The display control device as claimed in claim 2, wherein the small-sized display unit is incorporated in the main unit.

5. The display control device as claimed in claim 1, further comprising:
   a large-sized display unit for displaying route guidance information based on said route guidance data, said large display unit being connectible with the main unit through a communication cable,
   wherein said recognizing means recognizes a state of the large-sized display unit, and
   wherein said control means judges whether route guidance data is received from said navigation unit if the recognizing means recognizes that said large-sized display unit is unable to display, and interrupts display of the small-sized display unit and displays route guidance information based on the received route guidance data on the small-sized display unit when the route guidance data is received.

6. The display control device as claimed in claim 1, wherein the audio information is displayed upon termination of said display of said received route guidance data.

7. The display control device as claimed in claim 1, further comprising:
   one of a large-sized display unit and a combined display unit formed by combining a large-sized display and said small-sized display, said one of the large-sized display unit and the combined display unit being connected via a communication cable to the main unit.

8. The display control device as claimed in claim 7, wherein the control means controls the recognizing means to monitor a non-displayable state of said one of the large-sized display unit and the combined display unit.

9. The display control device according to claim 8, wherein when one of the large-sized display unit and the large-sized display of the combined display unit is recognized to be in the off state, controls the route guidance data generated by the navigation unit to be displayed through interruption on the small-sized display of the combined display unit.

10. The display control device as claimed in claim 1, wherein said display of audio information and said display of route guidance information are other than simultaneously displayed on a same display unit.

11. A display control device comprising:
    a small-sized display unit, operatively coupled to a navigation unit, for displaying information concerning an audio-system;
    a main unit connected via an interface to the navigation unit and the small-sized display unit with a communication cable,
    said main unit including:
      recognizing means for recognizing a state of the small-sized display unit; and
      control means which judges if a large-sized display unit is unable to display the route guidance information and displays route guidance information based on the received route guidance data on the small-sized display unit when the route guidance data is received; and
    one of a large-sized display unit and a combined display unit formed by combining a large-sized display and said small-sized display, said one of the large-sized display unit and the combined display unit being connected via a communication cable to the main unit,
    wherein the control means controls the recognizing means to monitor the on/off state of one of the large-sized display unit and the combined display unit, and when one of the large-sized display unit and the large-sized display of the combined display unit is recognized to be in the off state, causes the route guidance data generated by the navigation unit to be displayed through interruption on the small-sized display of the combined display unit.

12. A display control method of a display control device having a small-sized display unit, operatively coupled to a navigation unit for generating route guidance data, for displaying information concerning an audio-system, and a main unit connected via an interface to the navigation unit and the small-sized display unit with a communication cable, the method comprising:
    recognizing the connection of the small-sized display unit;
    sending out a request for route guidance display to the navigation unit when the connection of the small-sized display unit is recognized; and
    causing the received route guidance data to be displayed through interruption on the small-sized display unit when the route guidance data generated by the navigation unit is received via the communication cable and the interface,
    wherein said causing the received route guidance data to be displayed terminates the display of audio information.

13. The display control method as claimed in claim 12, wherein the audio information is displayed upon termination of said display of said received route guidance data.

14. The display control device as claimed in claim 12, wherein said display of audio information and said display of route guidance information are other than simultaneously displayed on a same display unit.

15. A display control system comprising:
    a navigation unit for generating route guidance data;
    a small-sized display unit, operatively coupled to said navigation unit, for displaying information concerning an audio-system;
    a large-sized display unit for displaying navigation information; and
    a main unit connected via an interface to the navigation unit, the small-sized display unit and the large-sized display unit with a communication cable,
    said main unit including:
      recognizing means which recognizes states of the small-sized display unit and the large-sized display unit; and
      control means which judges whether the route guidance data is received from said navigation unit when the recognizing means recognizes a state of said large-sized display unit is unable to display, and interrupts to display route guidance information based on the route guidance data on the small-sized display unit when the route guidance data is received, in place of the audio information being displayed.

16. The display control system as claimed in claim 15, wherein the audio information is displayed upon termination of said display of said received route guidance data.

17. The display control device as claimed in claim 15, wherein said display of audio information and said display of route guidance information are other than simultaneously displayed on a same display unit.

18. A display control system comprising:

a navigation unit for generating route guidance data;

a main unit connectable to a small-sized display unit for displaying information concerning an audio-system and a large-sized display unit for displaying route guidance information, which are connected to said navigation unit through an interface by a communication cable, said main unit including:

recognizing means which recognizes a state of a display unit; and control means which judges whether the route guidance data is received from said navigation unit when the recognizing means recognizes a state of the large-sized display unit is unable to display, and interrupts to display route guidance information based on the route guidance data on the small-sized display unit when the route guidance data is received, in place of the audio information being displayed.

19. The display control system as claimed in claim 18, wherein the audio information is displayed upon termination of said display of said received route guidance data.

20. The display control device as claimed in claim 18, wherein said display of audio information and said display of route guidance information are other than simultaneously displayed on a same display unit.

* * * * *